April 25, 1961 L. PÉRAS 2,981,398
AUTOMATIC POSITIONING DEVICES FOR WORK-PIECES
Filed July 19, 1957 6 Sheets-Sheet 3

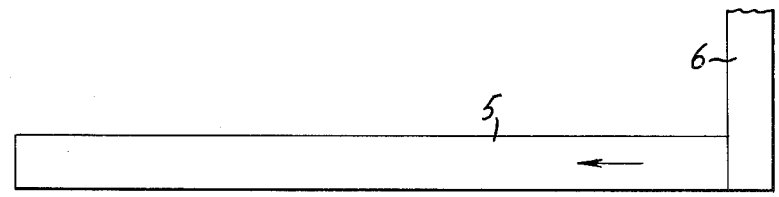
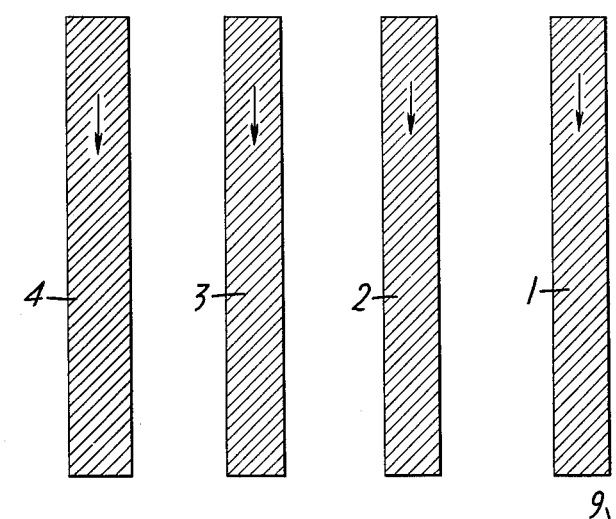
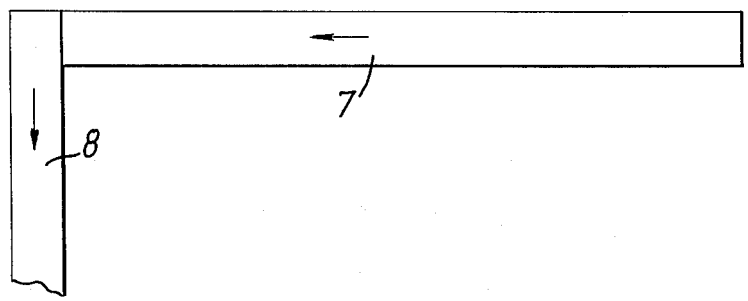
FIG. 1

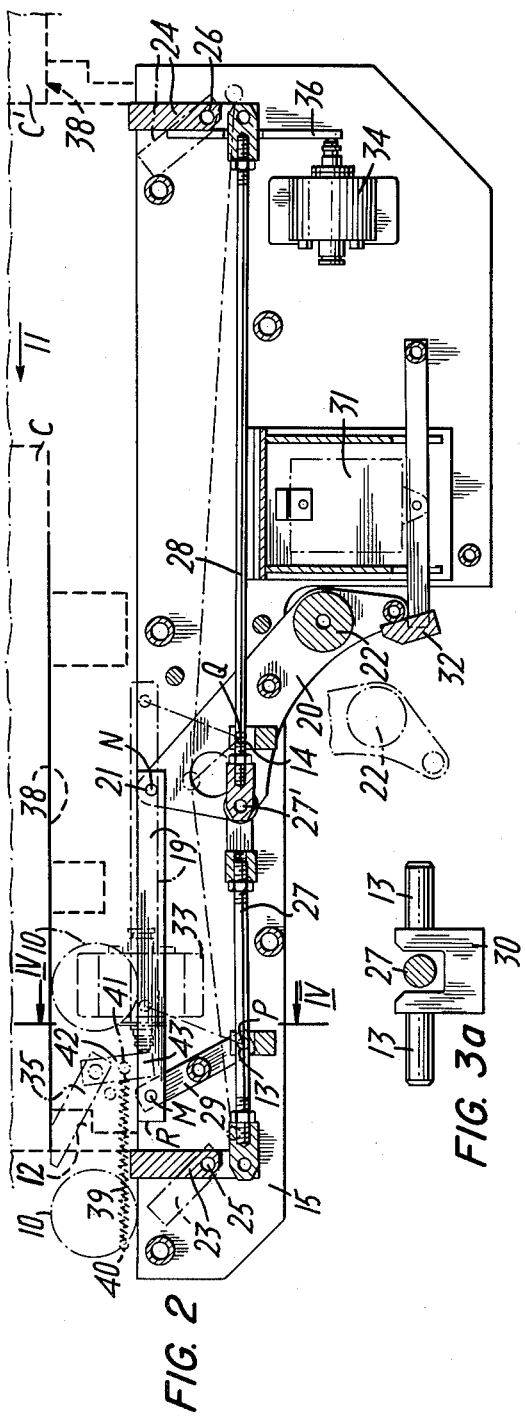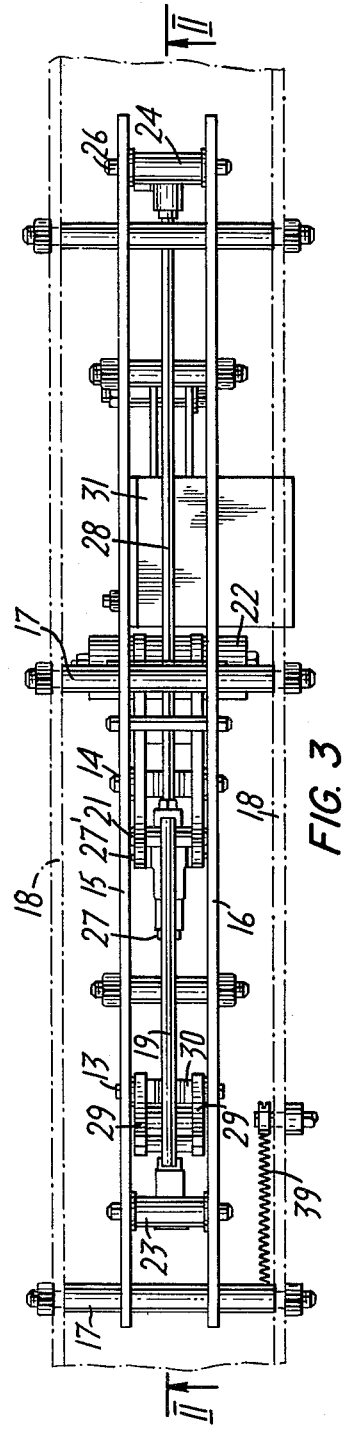

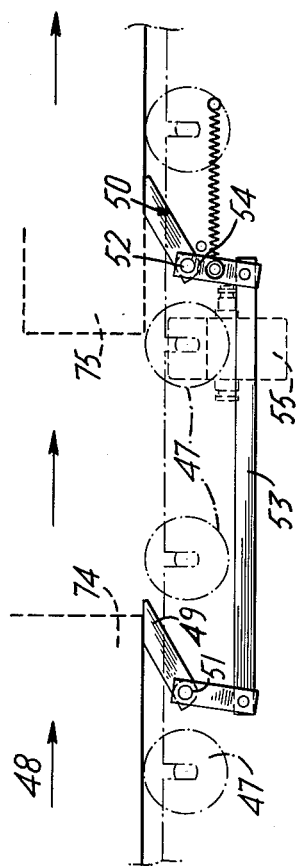
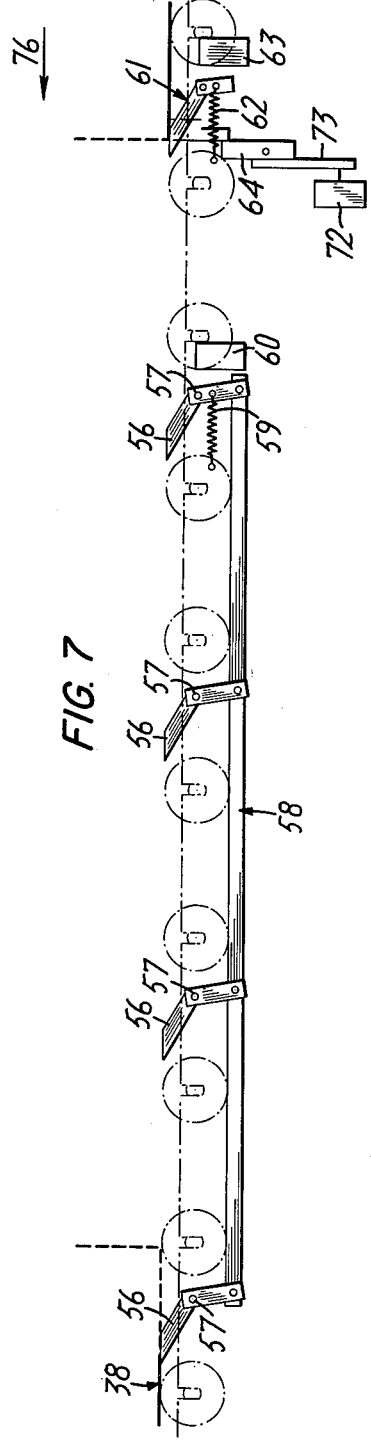

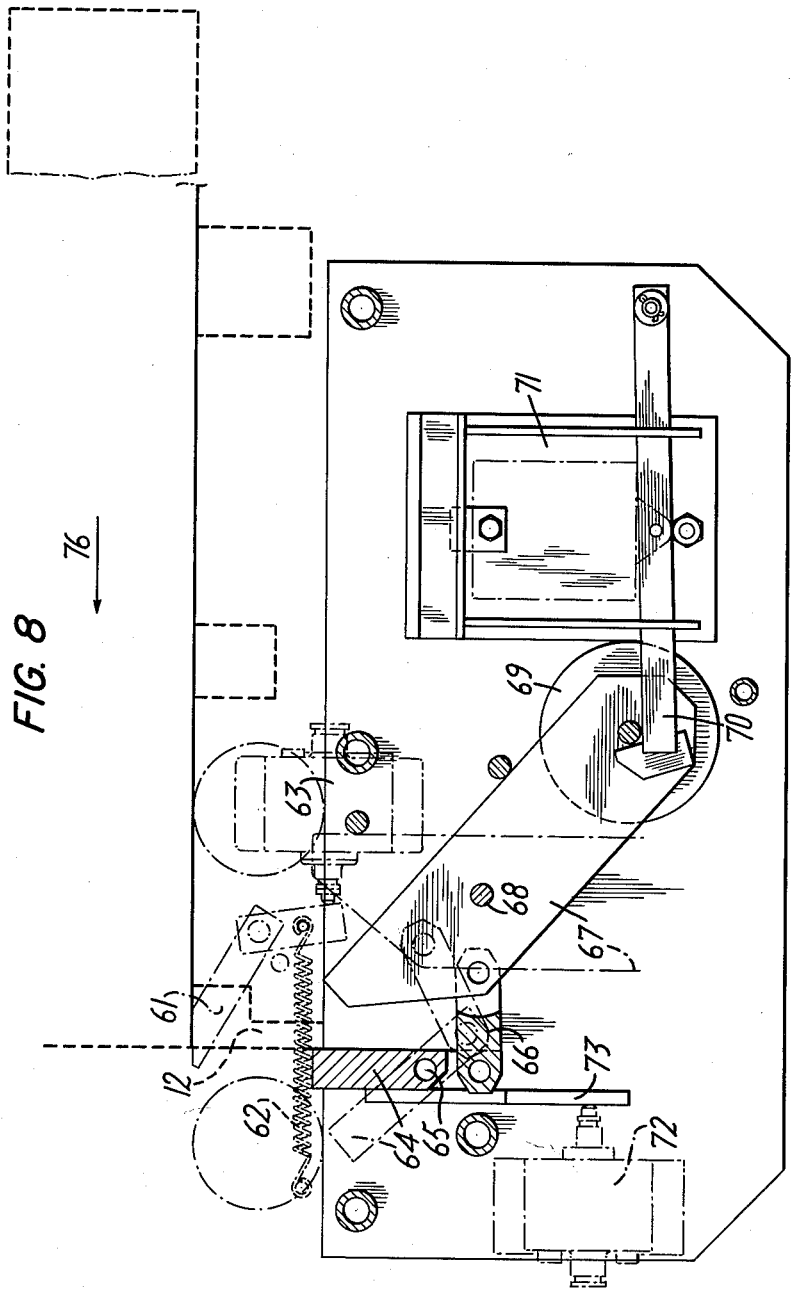

United States Patent Office 2,981,398
Patented Apr. 25, 1961

2,981,398
AUTOMATIC POSITIONING DEVICES FOR WORK-PIECES

Lucien Péras, Billancourt, France, assignor to Regie Nationale des Usines Renault, Billancourt, Seine, France, a French works Filed July 19, 1957, Ser. No. 672,910
Claims priority, application France Aug. 10, 1956
6 Claims. (Cl. 198—19)

In order to supply a number of machines working in parallel on the same operation, a single conveyor is often used, of the roller type for example, from which the machines automatically take the work-pieces when they are required, and place them after machining on a second conveyor for removal.

In order to obtain this automatic feed, it is necessary to be able to stop a work-piece in front of a machine which is ready for it while leaving sufficient space between the work-piece which precedes it and that which follows it, in order to allow the handling devices to take the work-piece and move it without interference. It is also necessary to ensure a sufficient stock to supply the machines without risk of choking the supply conveyor.

Finally it is necessary to arrange on the removal conveyor, for each machine, a free space which will allow it to deposit a work-piece which has just been machined on the conveyor without interference at the required moment.

The present invention has for its object the production of a device which enables these conditions to be fulfilled with sufficient safety to render possible its application to large scale manufacture.

The special features of the invention will further be more clearly shown from a form of embodiment which will now be described by way of example in the application to the supply of transfer machines for machining the cylinder blocks of automobile engines.

In the accompanying drawings:

Fig. 1 is a diagrammatic view of the installation of a group of four machines working in parallel;

Fig. 2 is a longitudinal cross-section of the positioning device for the work-pieces at the intake of each of the first three machines, following the line II—II of Fig. 3;

Fig. 3 is a plan view of the device shown in Fig. 2;

Fig. 6 is a similar view of the positioning device for the work-pieces on the output side of the first machine;

Fig. 7 is a diagrammatic view of the positioning device on the output side of the three other machines;

Fig. 8 is a view in detail with longitudinal cross-section of the device shown in Fig. 7;

Fig. 1 shows the general arrangement of a typical installation in which the present device can be employed. The number of machines has been fixed at four, but it will be clear that this number can be varied at will without changing in any respect the nature of the invention.

Figure 4:
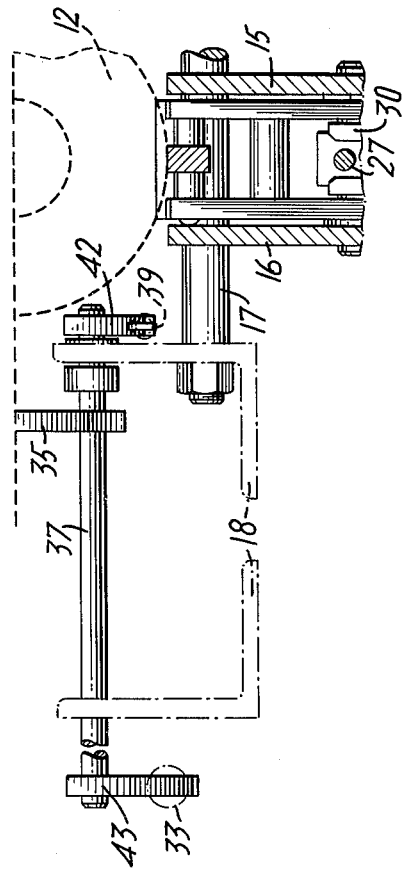
Fig. 4 is a detail view with cross-section of the foregoing device, taken along the line IV—IV of Fig. 2.

It can be seen that the machines 1, 2, 3 and 4 are served by the supply conveyor 5 which brings the work-pieces from the stock 6, and by the evacuation conveyor 7 which supplies the stock 8, the work-pieces moving on these conveyors in the direction of the arrows as indicated. The work-pieces are passed from the conveyors to the machines by arms of the type described in the United States patent application, Serial No. 669,574, filed in France by the present applicant on July 2, 1957, with the title "Automatic Handling Device for Work-Pieces Giving a Turning Movement to These Pieces."

Fig. 2 shows the device for distributing cylinder blocks placed level with the intake of each of the machines 1, 2 and 3, and in the axis of the conveyors, the rollers of which have been divided for that purpose into two parallel rows. The conveyor is shown diagrammatically by the rollers 10 which are driven in rotation in a continuous manner by a chain and through the medium of toothed wheels and of a friction device of the type described, in the patent application filed in United States of America by the present applicant on April 4, 1956 with the No. 576,019 and the title "Improvements in Roller Conveyors for Handling Loads."

The blocks are driven on these rollers in the direction of the arrow 11, the bearings of their line shaft moving between the two rows of rollers, as can be seen from the bearing 12 of a block C shown diagrammatically in Figs. 2 and 4.

The spacing and the stopping of the blocks in their forward movement are determined by means of movable stops which they can actuate during their passage, these stops being controlled on the other hand as a function of the requirements of the machines and of the distribution of the blocks on the downstream side of each of the first three machines.

The main part of the device shown in Fig. 2 is formed by an articulated parallelogram M, N, P, Q, the fixed shafts 13 and 14 of which are carried by two parallel plates 15 and 16, these being held in turn between the two rows of rollers by tierods 17 fixed on the frame 18 of the conveyor 5.

The movable flat rod 19 which forms the upper side MN of the said parallelogram can come into contact with the bearing 12 of the block. The side NQ is formed by a part of the member 20, pivoted at 14 and formed by two parallel plates pivoted at 21 with the straight rod 19 and carrying a counterweight 22 at their own extremities. The movable stops 23 and 24, pivotally mounted on the fixed shafts 25 and 26 carried by the plates 15 and 16, are respectively coupled to the rod systems 27 and 28 which are both articulated at 27¹ on the member 20. The side MP formed of two bars 29 articulated with the straight rod 19, is pivoted on the fixed shaft 13, formed like the shaft 14 by a member 30 (see Fig. 3a), intended to permit the free movement of the rods 27 and 28.

A fixed electro-magnet 31 is arranged in such manner that by attracting the bolt 32 it can overcome the action of the counterweight 22 on the member 20 for any given position of this latter. Two fixed contactors 33 and 34, operated by the passage of the blocks and through the medium of the levers 35 and 36, co-operate in the operation, as will be described later. It can be seen from Fig. 2 that the lever 36 is simply rigidly fixed to the stop-member 24. Fig. 4 clearly shows the operating device for the contactor 33, of which the lever 35, keyed on a shaft 37 supported by the frame of the conveyor, is arranged so as to come into contact with the inner flat surface 38 of the cylinder blocks. This lever is urged into its upper position by means of a tension spring 39 fixed at 40 and coupled at 41 to a bar 42 also fixed on the shaft 37. The operating finger proper 43 of this contactor 33 is fixed to the other extremity of the said shaft 37.

Figure 5:
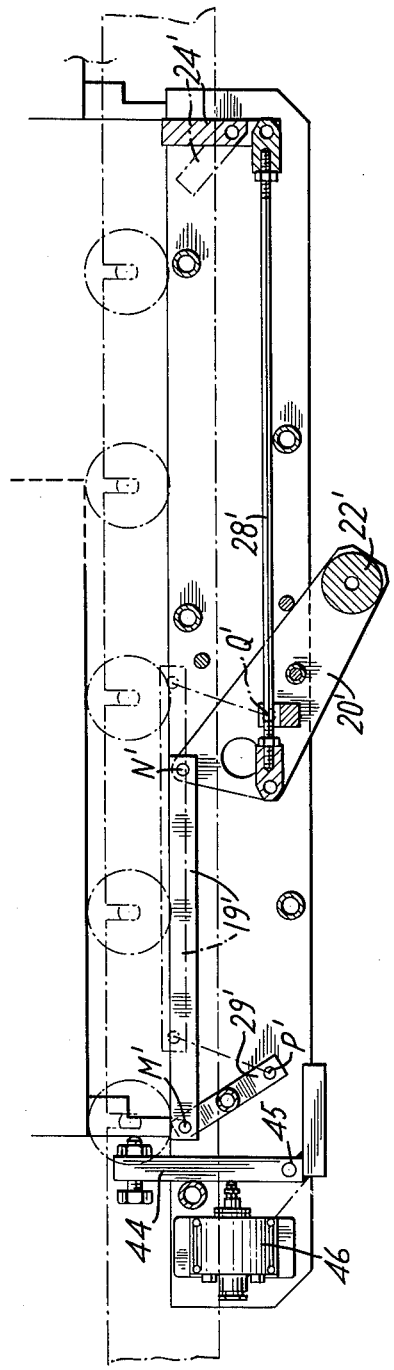
Fig. 5 is a cross-section similar to that of Fig. 2 of the positioning device for the work-pieces at the intake of the fourth machine.
Figure 9:
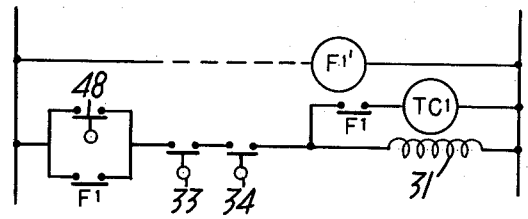
Fig. 9 is a schematic diagram of a portion of the automatic system for positioning workpieces at the input station of the first machine.
Figure 10:
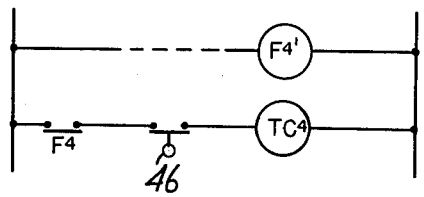
Fig. 10 is a schematic diagram of a portion of the automatic system for controlling the workpieces located at the input station of the last machine.
Figure 11:
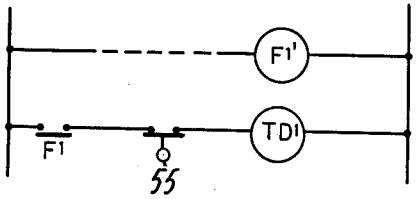
Fig. 11 is a schematic diagram of a portion of the automatic system for controlling workpieces located at the output station of the first machine.
Figure 12:
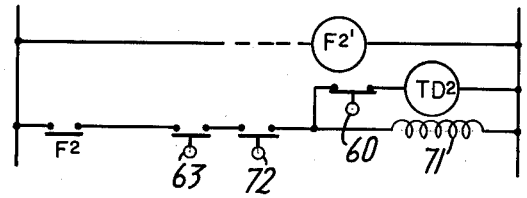
Fig. 12 is a schematic diagram of a portion of the automatic system controlling workpieces located at the output station of the second machine.

The distribution device for the machine 4 of substantially the same constitution, is adapted as a function of the fact that it must necessarily stop the forward movement of the cylinder block at the level of the last machine of the installation of the type indicated. There is again seen in Fig. 5 an articulated parallelogram $M^1N^1P^1Q^1$, comprising in particular the members $19^1$, $20^1$, $22^1$, $29^1$, $28^1$ and $24^1$. The movable stop 23 of the previous devices is replaced by an abutment 44 located at the end of the conveyor and pivoted at 45 so as to be able to actuate a contactor 46.

On the evacuation conveyor 7, the movement of the blocks is also controlled by movable stops which they can operate during their passage, these stops being further influenced by the necessity of unloading the machines, except in the particular case which on this occasion applies to the first machine.

At the output side of the machine 1, the blocks are placed on the conveyor 7 shown diagrammatically by its rollers 47 in Fig. 6, so as to be carried away in the direction of the arrow 48.

Two levers 49 and 50, spaced apart by the length of a block, and the function of which will be seen later, are mounted in the same way as previously indicated for the lever 44, on the pivotal shafts 51 and 52. They are connected to each other by a crank-arm 53, and are urged into their upper position by a tension spring acting on the arm 54 which is fixed to the arm 52. They can thus operate a contactor 55 when either of them is subjected to the pressure of a cylinder block.

Figs. 7 and 8 show the device located at the output side of each of the machines 2, 3 and 4, in order to control the unloading of each of them on to the conveyor 7. At the unloading point, are provided four levers 56 which co-operate with the desired portion of the conveyor 7 and, like those preceding are pivotally mounted on shafts 57 and rigidly coupled to each other for movement by a crank-arm 58. They are also urged into their upper position by a tension spring 59 and can actuate a contactor 60. Another lever 61 of this type is placed on the rolling track on the incoming side of the levers 56 and at a distance from the first of these levers which is slightly greater than the overall dimensions of the handling apparatus. Urged into its upper position by a spring 62 in the same way as the other levers, it can actuate a contactor 63.

A movable stop 64 pivoted on a fixed shaft 65 is coupled through a connecting rod 66 to a member 67 which pivots about the fixed shaft 68. This member 67, actuated by the passage of the blocks, is in addition subjected to the action of a counterweight 69, the effect of the latter being capable of being opposed by a bolt 70 which locks the counterweight when the bolt is attracted by the electromagnet 71.

A contactor 72 which enables the position of the stop 64 to be checked, is actuated by a finger 75 rigidly fixed to the stop member.

The operation of the assembly of this installation will also be able to be followed with the aid of the electrical diagrams of Figs. 9 to 12, in which the references F1', F2' and F4' respectively designate the first, second and fourth machine relays controlling the end of an operation cycle and the beginning of the following cycle. The references F1 to F4 designate the contacts of the above-mentioned relays and TC1 and TC4 designate the relays controlling the transfer devices feeding the first and the fourth machines, whereas the relays TD1 and TD2 control the transfer devices discharging the first and second machines. In these circuits, the contacts mentioned previously are shown in their position of rest corresponding to the absence of workpieces.

The operation of the whole assembly will be first of all explained for the supply of the machines.

The blocks move in front of the machines on the conveyor 5 (arrow 11), and the operation is considered under two cases:

(a) The machine 1 does not require a work piece. During the passage of a block C (see Fig. 2), the bearing 12 comes into contact with the straight rod 19 of the articulated system which is normally in the position shown in chain-dotted lines under the action of the counterweight 22, the stops 23 and 24 being withdrawn for this purpose. In its forward movement, the block carries the straight rod 19 with it up to the position indicated in full lines, against the action of the counterweight 22 and causing the stops 23 and 24 to rise. This straight rod and upstanding stop 24 then lock the next block in the position $C^1$. The block sliding along the straight rod 19 then actuates the contactor 33, the function of which will be explained later. It then frees the straight rod, passing over its extremity R, and the articulated system again takes up its initial position. The stop 23 being withdrawn in front of the block C, the latter continues its travel towards the next machine, while the stop 24, simultaneously withdrawn in front of the block $C^1$, has fixed a certain space between these blocks.

(b) The machine 1 requires a work-piece. The first operations indicated above again take place, and as before, the block C also actuates, when it reaches the extremity of the straight rod 19, the lever 35 which closes the contactor 33. In this case however, the machine which has given the signal that one workpiece is to be taken (closing of the contacts F1, Fig. 9) causes the excitation of the electro-magnet 31 by means of a contact 33, the electro-magnet 31 thus attracts the bolt 32 and blocks the counterweight in the high position. The result is that when the bearing 12 of the block C leaves the straight rod 19, the articulated system remains in its locked position, the block being stopped against the stop member 23 in the position from which it can be removed.

The handling arm of the type previously referred to then takes the block in order to introduce it into the machine (by excitation of relay TC1). As soon as the lever 35 is freed, the contactor 33 cuts-off the supply to the electro-magnet 31, the bolt 32 falls and, under the action of the counterweight of the articulated system, takes up its initial waiting position. The stop member 24 is withdrawn to free the block in the position $C^1$, and this block thus continues to move forward on the conveyor.

The device and its operation are identical in the case of the first three machines, and as the blocks must be stopped on a level with the last, the device of the machine 4 (see Fig. 5) is slightly different in its operation.

When a block is stopped in front of this machine, it is also necessary that the next block following should be stopped at a suitable distance.

Thus, when the bearing 12 of the cylinder block C causes the parallelogram $M^1$, $N^1$, $P^1$, $Q^1$ to rock towards the left, the stop $24^1$ is raised so as to stop the next block in the position $C^1$ (the position in full lines of the articulated system). This parallelogram is however arranged in such manner that the bearing 12 slides and remains applied against the straight rod $19^1$ for the position of removal of the block C which has just been stopped against the abutment 44 by closing the contactor 46.

The function of this contactor is to permit the handling arm to take the block C (by excitation of the relay TC4) in the case where it is required by the machine 4 (closing the contact F4), and this only in the correct position of the said bolck. When the block C is removed, the stop member 44 and the contactor 46 (Figs. 5 and 10) return to their position of rest, while the counterweight 22¹ returns the articulated system to its waiting position. The stop 24¹ is then withdrawn to permit the forward movement of the block which follows C¹.

The positioning device of the block for supplying to the machines: thus tends to effect in front of each machine the placing in position of a block for removal and to maintain between each machine and also on the input side of the first machine, a line of waiting blocks, whilst controlling the successive stages of the forward movement of the blocks which have been taken from the stocks.

For the satisfactory operation of the whole of this device, a certain number of safety measures are necessary. When a block comes into contact with the straight rod 19 or 19¹, it is essential that the next block following should not have passed over the stop 24 or 24¹, which means that a sufficient length must be given to these rods.

It is particularly necessary, in order to avoid a piling-up of the blocks on the conveyor table at the level of the machines to stop their forward movement towards the next following machine when the space on the input side of that machine is full.

To this end, a contactor 80 (Fig. 9) is provided on the output side of each of the devices of the three first machines, at a distance slightly greater than the length of a block, so that a block which has been stopped at the end of a waiting row may lock the articulated system in the position in which it holds back the following block as long as it is stopped, through the intermediary of the contactor which supplies the input side electro-magnet 31.

On the other hand, in order to prevent the electro-magnet 31 from being actuated by a demand made by the machine while the contactor 33 is closed by the lever 35 against which is applied the surface 38 of a block, the bearing 12 of which would cross or would have crossed over the stop 23, the contactor 33 is connected in series with the contactor 34 and the electro-magnet (see Fig. 9), and the latter can thus only be excited if both the stop members 23 and 24 are in the active position.

It can readily be seen that the positioning device for removing the blocks from the machines is essentially designed to ensure for its part a free place on the conveyor which enables the handling arm of each machine to place a finished block on the said conveyor without hindrance.

In the case of the machine 1, the problem is simplified, since there is no block placed on the intake side. It is only necessary to ensure that the necessary position is free to receive the block.

To this end, the levers 49 and 50, spaced by the length of the surface 38, are arranged in such manner that the first is actuated by the block in the discharging position 74 and the second by this same block in the eventual stopping position 75, this temporary position being fixable by the fact that the machine 2 requires to evacuate a block and in the manner which will be indicated later. When either of these levers is pushed in by a block, the contactor 55 (Figs. 6 and 11) is operated in the direction which prevents the machine 1 from discharging while this contactor continually permits such discharge in its position of rest. (See Fig. 11 control circuit of the relay TD1.)

In the case of the machines 2, 3 and 4, it is first of all necessary to stop the blocks which arrive, and not to permit discharge until the necessary position has been obtained.

Two cases may then arise:

(a) The machine has no block to discharge. The block which arrives in the direction of the arrow 76 first meets the upper extremity of the member 67 which is normally maintained in the position shown in chain-dotted lines in Fig. 8, in which position the movable stop 64 is withdrawn. Under the thrust of the block, this member 67 rocks until it reaches the position indicated in full lines, and the stop member 64 is raised. When the bearing 12 of this block frees the member 67, the latter returns to its initial position due to the action of the counterweight 69 and the stop 64 is again withdrawn to permit the forward movement of the block which thus passes on without stopping, up to the level of a discharge station on the output side.

(b) The machine needs to discharge a block. When the block rocks the member 67 as previously, together with the operating lever 61 of the contactor 63, this contactor, which is this time supplied with current by the machine through suitable circuitry, not shown, closes the energising circuit (Figs. 8 and 12) of the electro-magnet 71. The latter attracts the locking bolt 70 of the member 67, so that the stop 64 remains in its raised position so as to stop the block. The contactor 72 is also included in series in the circuit of the electro-magnet and plays the part of the contactor 34 of the supply devices, only permitting operation of the bolt at a suitable position of the block and of the stop member. These conditions are schematically shown in the case of the second machine in Fig. 12.

In order to ensure the space necessary for discharge on the output side of the block thus stopped, the levers 56 are arranged so as to control the satisfactory removal of the block which preceded it.

When none of these levers is subjected to the pressure of a block, the contactor 60 which they control, connected in series with the contactor 72 which ensures the stoppage of the block on the intake side, permits in its position of rest by excitation of the relay TD2 the discharge of the machine which it could previously prevent.

In the electrical circuit (Figs. 9–12) of the system relays F1' and F4' control the machine cycles from the end of a cycle to the beginning of the following cycle and are provided with respective contacts F1 to F4 for this purpose. The transfer devices feeding the machines are provided with control relays TC1 and TC4 which control feeding of the machines and control relays TD1 and TD2 of the transfer devices (not shown) control discharging or unloading of the machines.

The present form of embodiment has of course been given especially by way of indication only, and alternative forms may be envisaged which fall within the scope of the invention.

I claim:

1. In combination with a driven supply conveyor operable to transport unfinished workpieces thereon to a plurality of machines arranged for operating in parallel and a driven discharge conveyor operable to transport finished workpieces away from the machines, the supply conveyor having a plurality of zones spaced along the conveyor each corresponding to an input station for a respective machine and the discharge conveyor having a plurality of zones spaced along the discharge conveyor each corresponding to an output station for a respective machine, an automatic system for controlling the positioning of workpieces at the input and output stations of the individual machines and for insuring transportation of the workpieces in proper spaced relationship comprising, for each input station upstream of a final downstream station a linkage system operable to a first operative position in readiness to engage workpieces when they enter one-by-one the zone corresponding to the station and operable to a second operative position by each successive individual workpiece when it enters the station, a pair of spaced stops operably connected to the linkage system and operable to a lowered position when the linkage is in its first operative position and operable to a raised position when linkage system is in its second operative position, one of the stops being disposed for stopping a workpiece in the input station when in a raised position and the second stop being disposed to stop a next successive workpiece upstream of the station outside of the station, means operably connected to the linkage system for constantly biasing it to its first operative position and operative to return the linkage system to said first position when the individual workpiece in the station is alternatively removed from the input stations and when it is transported past a predetermined point on the linkage system, means under control of the machine associated with the station for rendering said biasing means ineffective thereby to cause the linkage system to remain in its second operative position holding the two stops in upstanding position so that workpieces stopped thereby are held stationary only until the workpiece at an input station to a respective machine is transferred out of the station on to the respective machine, means at said final station for holding a workpiece in said final station in readiness for transfer to a machine associated with said final station and means for holding upstream workpieces outside of said final station until the station is free of a workpiece and for allowing the workpieces to enter the station one-by-one as needed at the machine to which the final station belongs, for each output station downstream of a first output station which is upstream of all other output stations means under control of a respective machine for precluding entry of upstream workpieces into the station when the respective machine is ready to have a finished workpiece transferred from it on to its respective station on the discharge conveyor, and for said first output station means to prevent transfer of a finished workpiece from its associated machine on to the station unless the station is free of workpieces.

2. In combination with a driven supply conveyor operable to transport unfinished workpieces thereon to a plurality of machines arranged for operating in parallel and a driven discharge conveyor operable to transport finished workpieces away from the machines, the supply conveyor having a plurality of zones spaced along the conveyor each corresponding to an input station for a respective machine and the discharge conveyor having a plurality of zones spaced along the discharge conveyor each corresponding to an output station for a respective machine, an automatic system for controlling the positioning of workpieces at the input and output stations of the individual machines and for insuring transportation of the workpieces in proper spaced relationship comprising, for each input station upstream of a final downstream station a linkage system operable to a first operative position in readiness to engage workpieces when they enter one-by-one the zone corresponding to the station and operable to a second operative position by each successive individual workpiece when it enters the station, a pair of spaced stops operably connected to the linkage system and operable to a lowered position when the linkage is in its first operative position and operable to a raised position when linkage system is in its second operative position, one of the stops being disposed for stopping a workpiece in the input station when in a raised position and the second stop being disposed to stop a next successive workpiece upstream of the station outside of the station, means comprising a counterweight operably connected to the linkage system for constantly biasing it to its first operative position and operative to return the linkage system to said first position when the individual workpiece in the station is alternatively removed from the input station and when it is transported past a predetermined point on the linkage system, means under control of the machine associated with the station for rendering said counterweight ineffective thereby to cause the linkage system to remain in its second operative position holding the two stops in upstanding position so that workpieces stopped thereby are held stationary only until the workpiece at an input station to a respective machine is transferred out of the station on to the respective machine, means at said final station for holding a workpiece in said final station in readiness for transfer to a machine associated with said final station and means for holding upstream workpieces outside of said final station until the station is free of a workpiece and for allowing the workpieces to enter the station one-by-one, as needed at the machine to which the final station belongs for each output station downstream of a first output station which is upstream of all other output stations means under control of a respective machine for precluding entry of upstream workpieces into the station when the respective machine is ready to have a finished workpiece transferred from it on to its respective station on the discharge conveyor, and for said first output station means to prevent transfer of a finished workpiece from its associated machine on to the station unless the station is free of workpieces.

3. In combination with a driven supply conveyor operable to transport unfinished workpieces thereon to a plurality of machines arranged for operating in parallel and a driven discharge conveyor operable to transport finished workpieces away from the machines, the supply conveyor having a plurality of zones spaced along the conveyor each corresponding to an input station for a respective machine and the discharge conveyor having a plurality of zones spaced along the discharge conveyor each corresponding to an output station for a respective machine, an automatic system for controlling the positioning of workpieces at the input and output stations of the individual machines and for insuring transportation of the workpieces in proper spaced relationship comprising, for each input station upstream of a final downstream station a linkage system operable to a first operative position in readiness to engage workpieces when they enter one-by-one the zone corresponding to the station and operable to a second operative position by each successive individual workpiece when it enters the station, a pair of spaced stops operably connected to the linkage system and operable to a lowered position when the linkage is in its first operative position and operable to a raised position when linkage system is in its second operative position, one of the stops being disposed for stopping a workpiece in the input station when in a raised position and the second stop being disposed to stop a next successive workpiece upstream of the station outside of the station, means operably connected to the linkage system for constantly biasing it to its first operative position and operative to return the linkage system to said first position when the individual workpiece in the station is alternatively removed from the input station and when it is transported past a predetermined point on the linkage system, means under control of the machine associated with the station for rendering said biasing means ineffective thereby to cause the linkage system to remain in its second operative position holding the two stops in upstanding position so that workpieces stopped thereby are held stationary only until the workpiece at an input station to a respective machine is transferred out of the station on to the respective machine, means at said final station for holding a workpiece in said final station in readiness for transfer to a machine associated with said final station and means for holding upstream workpieces outside of said final station until the station is free of a workpiece and for allowing the workpieces to enter the station one-by-one, for each output station downstream of a first output station which is upstream of all other output stations means under control of a respective machine for precluding entry of upstream workpieces into the station when the respective machine is ready to have a finished workpiece transferred from it on to its respective station on the discharge conveyor, and for said first output station means responsive to workpieces in said first output station to prevent transfer of a finished workpiece from its associated machine on to the station unless the station is free of workpieces.

4. In combination with a driven supply conveyor operable to transport unfinished workpieces thereon to a plurality of machines arranged for operating in parallel and a driven discharge conveyor operable to transport finished workpieces away from the machines, the supply conveyor having a plurality of zones spaced along the conveyor each corresponding to an input station for a respective machine and the discharge conveyor having a plurality of zones spaced along the discharge conveyor each corresponding to an output station for a respective machine, an automatic system for controlling the positioning of workpieces at the input and output stations of the individual machines and for insuring transportation of the workpieces in proper spaced relationship comprising, for each input station upstream of a final downstream station a linkage system operable to a first operative position in readiness to engage workpieces when they enter one-by-one the zone corresponding to the station and operable to a second operative position by each successive individual workpiece when it enters the station, a pair of spaced stops operably connected to the linkage system and operable to a lowered position when the linkage is in its first operative position and operable to a raised position when linkage system is in its second operative position, one of the stops being disposed for stopping a workpiece in the input station when in a raised position and the second stop being disposed to stop a next successive workpiece upstream of the station outside of the station, means operably connected to the linkage system for constantly biasing it to its first operative position and operative to return the linkage system to said first position when the individual workpiece in the station is alternatively removed from the input station and when it is transported past a predetermined point on the linkage system, means under control of the machine associated with the station for rendering said biasing means ineffective thereby to cause the linkage system to remain in its second operative position holding the two stops in upstanding position so that workpieces stopped thereby are held stationary only until the workpiece at an input station to a respective machine is transferred out of the station on to the respective machine, another linkage system at said final station comprising means for holding a workpiece in said final station in readiness for transfer to a machine associated with said final station and means for holding upstream workpieces outside of said final station until the station is free of a workpiece and for allowing the workpieces to enter the station one-by-one, for each output station downstream of a first output station which is upstream of all other output stations means under control of a respective machine for precluding entry of upstream workpieces into the station when the respective machine is ready to have a finished workpiece transferred from it on to its respective station on the discharge conveyor, and for said first output station means to prevent transfer of a finished workpiece from its associated machine on to the station unless the station is free of workpieces.

5. In combination with a driven supply conveyor operable to transport unfinished workpieces thereon to a plurality of machines arranged for operating in parallel and a driven discharge conveyor operable to transport finished workpieces away from the machines, the supply conveyor having a plurality of zones spaced along the conveyor each corresponding to an input station for a respective machine and the discharge conveyor having a plurality of zones spaced along the discharge conveyor each corresponding to an output station for a respective machine, an automatic system for controlling the positioning of workpieces at the input and output stations of the individual machines and for insuring transportation of the workpieces in proper spaced relationship comprising, for each input station upstream of a final downstream station a linkage system operable to a first operative position in readiness to engage workpieces when they enter one-by-one the zone corresponding to the station and operable to a second operative position by each successive individual workpiece when it enters the station, a pair of spaced stops operably connected to the linkage system and operable to a lowered position when the linkage is in its first operative position and operable to a raised position when linkage system is in its second operative position, one of the stops being disposed for stopping a workpiece in the input station when in a raised position and the second stop being disposed to stop a next successive workpiece upstream of the station outside of the station, means comprising a counterweight operably connected to the linkage system for constantly biasing it to its first operative position and operative to return the linkage system to said first position when the individual workpiece in the station is alternatively removed from the input station and when it is transported past a predetermined point on the linkage system, means comprising a solenoid-operated stop under control of the machine associated with the station for rendering said counterweight ineffective thereby to cause the linkage system to remain in its second operative position holding the two stops in upstanding position so that workpieces stopped thereby are held stationary only until the workpiece at an input station to a respective machine is transferred out of the station on to the respective machine, means at said final station for holding a workpiece in said final station in readiness for transfer to a machine associated with said final station and means for holding upstream workpieces outside of said final station until the station is free of a workpiece and for allowing the workpieces to enter the station one-by-one, for each output station downstream of a first output station which is upstream of all other output stations means under control of a respective machine for precluding entry of upstream workpieces into the station when the respective machine is ready to have a finished workpiece transferred from it on to its respective station on the discharge conveyor, and for said first output station means to prevent transfer of a finished workpiece from its associated machine on to the station unless the station is free of workpieces.

6. In combination with a driven supply conveyor operable to transport unfinished workpieces thereon to a plurality of machines arranged for operating in parallel and a driven discharge conveyor operable to transport finished workpieces away from the machines, the supply conveyor having a plurality of zones spaced along the conveyor each corresponding to an input station for a respective machine and the discharge conveyor having a plurality of zones spaced along the discharge conveyor each corresponding to an output station for a respcetive machine, an automatic system for controlling the positioning of workpieces at the input and output stations of the individual machines and for insuring transportation of the workpieces in proper spaced relationship comprising, for each input station upstream of a final downstream station a linkage system operable to a first operative position in readiness to engage workpieces when they enter one-by-one the zone corresponding to the station and operable to a second operative position by each successive individual workpiece when it enters the station, a pair of spaced stops operably connected to the linkage system and operable to a lowered position when said linkage system is in its first operative position and operable to a raised position when said linkage system is in its second operative position, one of the stops being disposed for stopping a workpiece in the input station when in a raised position and the second stop being disposed to stop a next successive workpiece upstream of the station outside of the station, means operably connected to said linkage system for constantly biasing it to its first operative position and operative to return said linkage system to said first operative position when the individual workpiece in the station is alternatively removed from the input station and when it is transported past a predetermined point on said linkage system, means under control of the machine associated with the station for rendering said biasing means ineffective thereby to cause the linkage system to remain in its second operative position holding the two stops in upstanding position so that workpieces stopped thereby are held stationary only until the workpiece at an input station to a respective machine is transferred out of the station on to the respective machine, means disposed on the supply conveyor upstream of the input stations between said machines and operable by said workpieces to render said biasing means ineffective and limit the number of workpieces in readiness waiting to enter an input station thereby to preclude piling up of the workpieces, means at said final station for holding a workpiece in said final station in readiness for transfer to a machine associated with said final station, and means for holding upstream workpieces outside of said final station until the station is free of a workpiece and for allowing the workpieces to enter said final station one-by-one, for each output station downstream of a first output station which is upstream of all other output stations means under control of a respective machine for precluding entry of upstream workpieces into the station when the respective machine is ready to have a finished workpiece transferred from it on to its respective station on the discharge conveyor, and for said first output station means responsive to workpieces in said first output station to prevent transfer of a finished workpiece from its associated machine on to the station unless the station is free of workpieces.

References Cited in the file of this patent
UNITED STATES PATENTS

| | | |
|---|---|---|
| 2,789,678 | Hickin | Apr. 23, 1957 |
| 2,866,534 | Carter | Dec. 30, 1958 |